UNITED STATES PATENT OFFICE.

GRAHAM H. HAMRICK, OF PHILIPPI, WEST VIRGINIA.

PROCESS OF MANUFACTURING BUTTER.

SPECIFICATION forming part of Letters Patent No. 433,729, dated August 5, 1890.

Application filed March 10, 1890. Serial No. 343,373. (No specimens.)

*To all whom it may concern:*

Be it known that I, GRAHAM H. HAMRICK, a citizen of the United States, residing at Philippi, in the county of Barbour and State of West Virginia, have invented certain new and useful Improvements in the Process for the Manufacture of Butter; and I do declare the following to be a full, clear, and exact description of the invention, such as will enable others skilled in the art to which it appertains to make and use the same.

It is the object of my invention both to shorten and improve the process of making butter by drawing the cream and causing it to rise more quickly and thoroughly, and also to add greatly to the keeping properties of the product.

To this end my improvement consists in the employment of sulphurous-acid gas at that stage in the manufacture of butter at which the cream is separated from the milk, the said gas being applied in contact with the milk, and preferably by the burning of sublimed sulphur in a closed vessel containing the milk.

My improvement also consists in the aforesaid use of sulphurous-acid gas followed by a working and washing of the butter in a weak solution of salicylic acid.

In order to make my invention more clearly understood, I will now describe a practical manner of carrying the same into effect. The milk from which it is desired to extract the cream is first placed in a suitable vessel which is air-tight and which has above the surface of the milk a chamber or space. I then charge this chamber with sulphurous-acid gas, either by conducting the gas to the chamber from some source of supply by a pipe, or, as will be more convenient in some cases, by burning a small quantity of sublimed sulphur in the chamber. For a single gallon of milk a tea-spoonful of sulphur may be so employed and will produce the necessary amount of gas. I then permit the gas to remain in contact with the milk for a suitable length of time—say one hour—during which time the milk may either remain quiescent or may be slightly stirred or agitated. The cream will then have been thoroughly extracted, and having been skimmed off is churned in the usual or any suitable or preferred manner. I then prepare a solution or wash consisting of one gallon of water having sufficient salt dissolved therein to cause the solution to bear an egg, one-half pound of granulated or other pure sugar, and one-half of a spoonful of crystallized saltpeter dissolved in a small quantity of warm water. This solution I boil and skim. It may be termed "Solution No. 2." I also prepare a solution, which may be termed "Solution No. 1," consisting of salicylic acid and water in the proportions of about one tea-spoonful of the acid to one pint of water. I then take a sufficient quantity of Solution No. 1, dependent upon the amount of butter to be treated, and work and wash the butter thoroughly therein until the buttermilk is all washed out. I then salt the butter in the usual manner, place it, in the form of a pat or roll, in a jar or other suitable receptacle, and cover it with a sufficient quantity of Solution No. 2. It will then keep fresh for a long time.

Having thus described my invention, what I claim as new, and desire to secure by Letters Patent of the United States, is—

1. The herein-described method of facilitating the drawing or raising of cream from milk consisting in subjecting the milk to the action of sulphurous-acid gas, substantially as set forth.

2. In the manufacture of butter, the herein-described process or method, consisting in subjecting the milk to the action of sulphurous-acid gas while the cream is being raised, then removing the cream and churning it to produce butter, and then washing the butter and removing the buttermilk by a solution of salicylic acid, substantially as set forth.

In testimony whereof I affix my signature in the presence of two witnesses.

GRAHAM H. HAMRICK.

Witnesses:
H. N. LOW,
E. K. STURTEVANT.